United States Patent [19]

Falk et al.

[11] 3,759,462

[45] Sept. 18, 1973

[54] TAPE TRANSPORT APPARATUS WITH END OF TAPE SENSING CONTROL

[75] Inventors: Mervin L. Falk, Sunnyvale; Joseph P. Denk, Newark, both of Calif.

[73] Assignee: Newell Industries Inc., Sunnyvale, Calif.

[22] Filed: Aug. 21, 1972

[21] Appl. No.: 282,404

[52] U.S. Cl. .................................. 242/186, 274/4 D

[51] Int. Cl.... B65h 59/38, G03b 1/04, G11b 15/32

[58] Field of Search..........242/186–198, 208, 210; 274/4 R, 4 D, 11 R, 11 D

[56] References Cited

UNITED STATES PATENTS

| | | | |
|---|---|---|---|
| 2,987,264 | 6/1961 | Hoskin | 242/191 |
| 3,258,214 | 6/1966 | Comstock 3rd | 242/208 |
| 3,582,013 | 6/1971 | Bevetta | 242/186 |

*Primary Examiner*—Leonard D. Christian
*Attorney*—Paul D. Flehr et al.

[57] ABSTRACT

An end of tape sensing interlock control system for a tape transport of a type employing a length of tape wrapped to form supply and take-up rolls and having a rotating, annular, resilient body disposed to ride against and drive the take-up roll includes a rotatable take-up hub, a capstan supported adjacent the hub. An elongate pliable tendon is secured at one end to the capstan and its opposite end to an interlock control part movable between advanced and retracted positions to operate an interlock device. Means for guiding the tendon between the capstan and control part are further provided as well as means responsive to the absence of tape upon the hub acting to couple the capstan to the hub and cause the capstan to wind up the tendon thereon so as to move the control part to operate the interlock device after a predetermined degree of rotation of the capstan. The degree of rotation of the capstan is sufficient to permit withdrawal of tape onto the supply roll before operating the interlock device under movement of the control part so as to insure that the tape has been entirely rewound upon the supply roll before releasing the interlock.

6 Claims, 9 Drawing Figures

TAPE TRANSPORT APPARATUS WITH END OF TAPE SENSING CONTROL

BACKGROUND OF THE INVENTION

This invention pertains to a tape transport apparatus particularly suitable for magnetic recording tape wrapped to form supply and take-up rolls and characterized by means for detecting the absence of tape upon a hub forming one of the rolls of tape whereby an interlock device can be operated in response to so detecting such absence. This invention is particularly useful in detecting the absence of tape disposed upon the take-up roll of a tape transport whereupon after a predetermined time delay, the lid to the transport apparatus is unlocked automatically.

In tape transport equipment such as those types suitable for manufacture and sale to the unsophisticated consumer, maintenance of the transport in a sealed envelope during playing of the tape either for recording or playback is typically desirable in order to avoid fouling the tape and creating other problems in the handling of the tape by the machine.

Further, where a tpae is designed to be played first in one direction and then fed in an opposite direction in order to complete the playing of the tape, it is desirable, if not necessary, to insure that the tape becomes fully rewound onto the original supply roll before any attempt is made to remove the tape from the machine. This is particularly true where tapes are provided individually as distinguished from situations where the tape may be wound upon each of two rolls and mounted in a cassette type of envelope to be handled as a unit.

In addition to the above circumstances, it is sometimes desirable to determine when no tape exists on the supply roll and thereby provide an indication that the tape has been entirely transferred to the take-up roll, whereby the motor can be turned off at such times.

Accordingly, there has been a need to know or to detect that condition of tape transports of the kind described wherein all tape has been removed from one or the other of the supply or take-up rolls.

As described herein, however, a tape transport apparatus is disclosed of a type characterized by means for detecting the presence or absence of tape upon the take-up hub so as to operate an interlock device which permits the opening of a lid or cover associated with the supply roll whereby the supply roll can be removed. Accordingly, only when all of the tape has been removed from the take-up hub and rewound upon the supply roll, can the lid be opened so as to remove the supply roll.

SUMMARY OF THE INVENTION AND OBJECTS

A tape transport apparatus of a type employing a length of tape wrapped to form supply and take-up rolls is disclosed and characterized by an end of tape sensing interlock control system comprising a hub adapted to carry a length of tape wrapped therearound, a capstan and means supporting the capstan in a position above the hub for rotation independently thereof.

An interlock device having a control part movable between advanced and retracted positions so as to operate the interlock between first and second states or conditions serves, in the present instance, preferably to lock the lid or cover to a supply roll compartment. An elongate tendon is coupled at its respective ends to the movable control part and the capstan. Clutch means responsive to the absence of tape on the hub serve to couple the capstan to the hub to cause the capstan to wind up the tendon and move the movable part to cause the interlock device to unlock the lid closure under continued driving of an annular resilient body disposed to ride against and drive the supply and take-up rolls.

It is a general object of the present invention to provide an improved tape transport apparatus.

It is another object of the invention to provide an improved tape transport apparatus particularly characterized by an interlock device operated by the absence of tape wrapped upon one of the hubs of the transport.

It is yet another object of the invention to provide an improved tape transport characterized by an interlock device which serves, after a predetermined time delay, to unlock the lid or closure of a closed case containing the transport. The time delay is defined as sufficient to permit the full retraction and rewrapping of the tape from the tape path defined between the supply and take-up hubs.

The foregoing and other objects of the invention will become more readily evident from the following detailed description of a preferred embodiment.

DETAILED DESCRIPTION OF A PREFERRED EMBODIMENT

Figure 1:
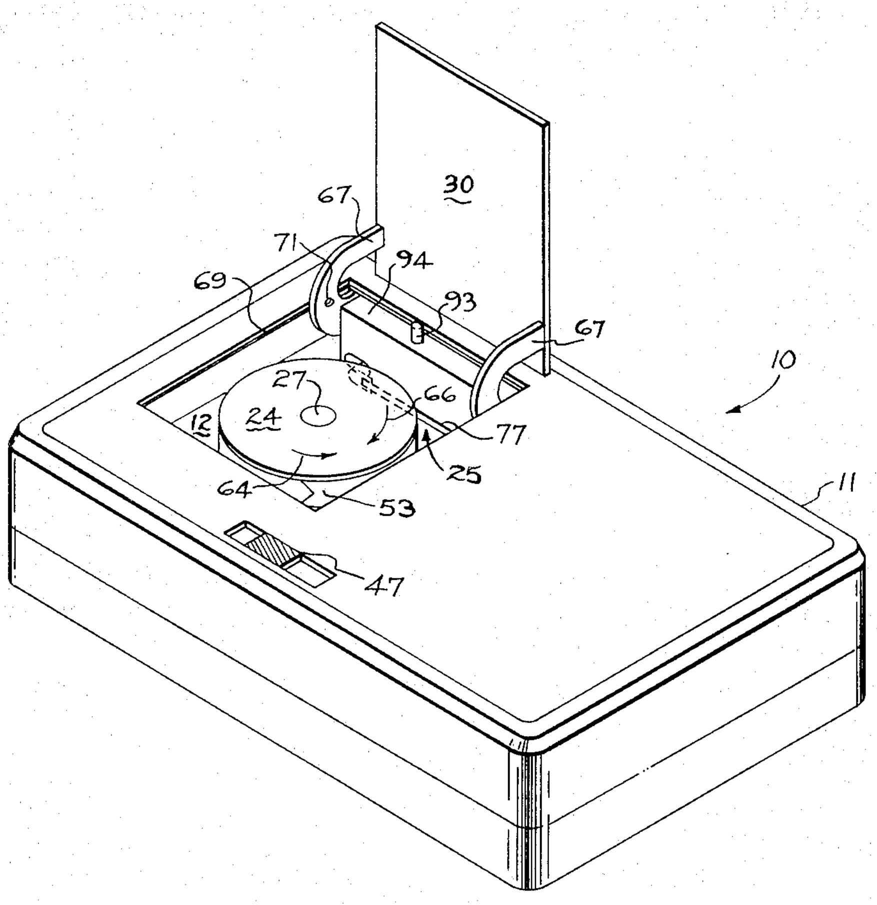
FIG. 1 shows a diagrammatic perspective view of a tape transport apparatus according to the invention.
Figure 2:
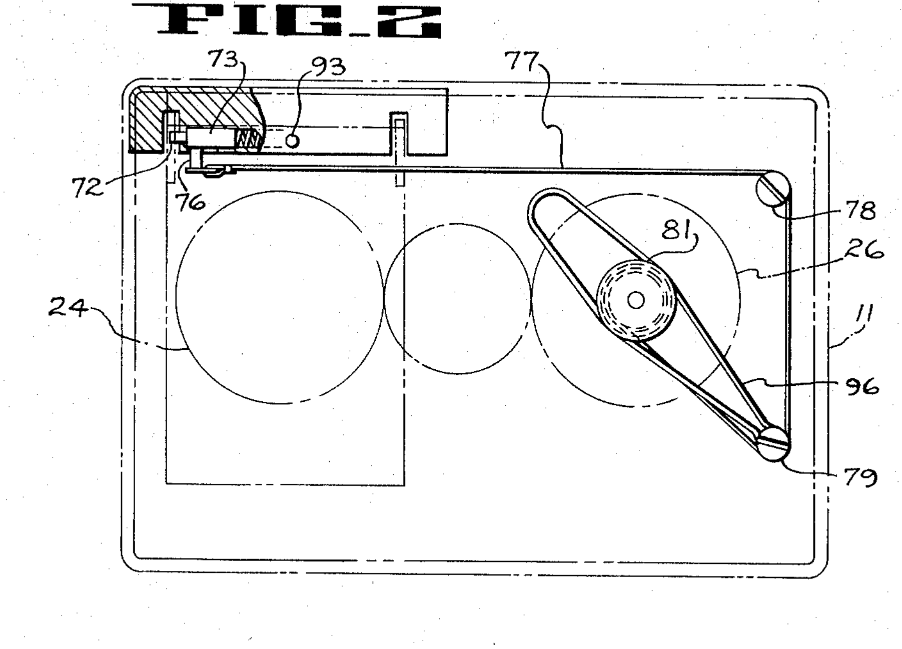
FIG. 2 shows, in plan view, a diagram of the transport shown in FIG. 1 with cover removed.

The tape transport apparatus 10 comprises, in general, an outer support case 11 which, in turn, supports a deck 12 for carrying the major components of the system.

A drive motor 13 includes a drive shaft 14 which serves, by means of the belt 15, to drive fly wheel 16 as is mounted for rotation with shaft 17 journalled in the journal bearing 18 and 19 so as to dispose the upper end of shaft 17 to operate as a drive spindle disposed in driving relation with the resilient tire 21 of the annular idler body 22 mounted for rotation on the support axle 23. Supply and take-up reels 24, 26 each include hub portions 56, 58 for mounting the two reels 24, 26 for rotation on support spindles or posts 27, 28 carried by the outer end of the swing arms 29, 31 respectively.

A cavity 25 in case 11 contains supply reel 24 whereby a hinged lid 30 moves between advanced and retracted positions to close and expose cavity 25.

Swing arms 29, 31 are each constructed in substantially identical style and, accordingly, swing arm 29 will be described as exemplary.

A mounting post 32 is fixed to and extends downwardly from the underside of deck 12 for receiving thereon one of the two swing arms 29, 31. Swing arms 29, 31 each include a mounting opening disposed to slide in closely spaced relation over the exterior of post 32. A coil spring 34 having a number of convolutions, on the order of six or seven, is wrapped about post 32 and anchored thereto in conventional style, as for example, by bending an end 34a thereof radially inwardly into a suitable opening formed in post 32. Finally, a snap washer 36 engages a groove on post 32 to hold swing arm 29 or 31 on the post.

Each swing arm includes a lever portion 37 carrying a pin 38 disposed transversely of the plane of portion 37 for engaging the tailpiece 39 of coil spring 34. Tailpiece 39 associated with swing arm 29 on the supply side of transport 10 is captured in an elongate notch 41 formed beneath the elongate control bar 42 for purposes as will be explained further below. Similarly, tailpiece 43 associated with coil spring 34 pertaining to swing arm 31 is captured in an elongate notch 44 also formed beneath control bar 42.

A bias spring 46 extends between the ends of the two swing arms 29, 31 so as to draw the ends thereof together to bring the hub portions of supply and take-up reels 24, 26 into engagement with the tire carried on annular idler body 22.

As explained in greater detail in U.S. Pat. No. 3,370,803 and U.S. Pat. No. 3,370,804, tension is applied to the span of tape extending between supply and take-up reels 24, 26 by applying a greater compressive force to the interface defined between an annular resilient drive body and a take-up roll of tape than is provided at the interface defined between the annular resilient rotating drive body and the supply roll of tape.

Accordingly, control bar 42 in conjunction with the bias spring 46 and the coil spring tailpiece 39, 43 serves to provide a greater compressive force urging the take-up roll of tape against body 22 than urges the supply reel of tape against body 22 as now to be described.

Figure 6:
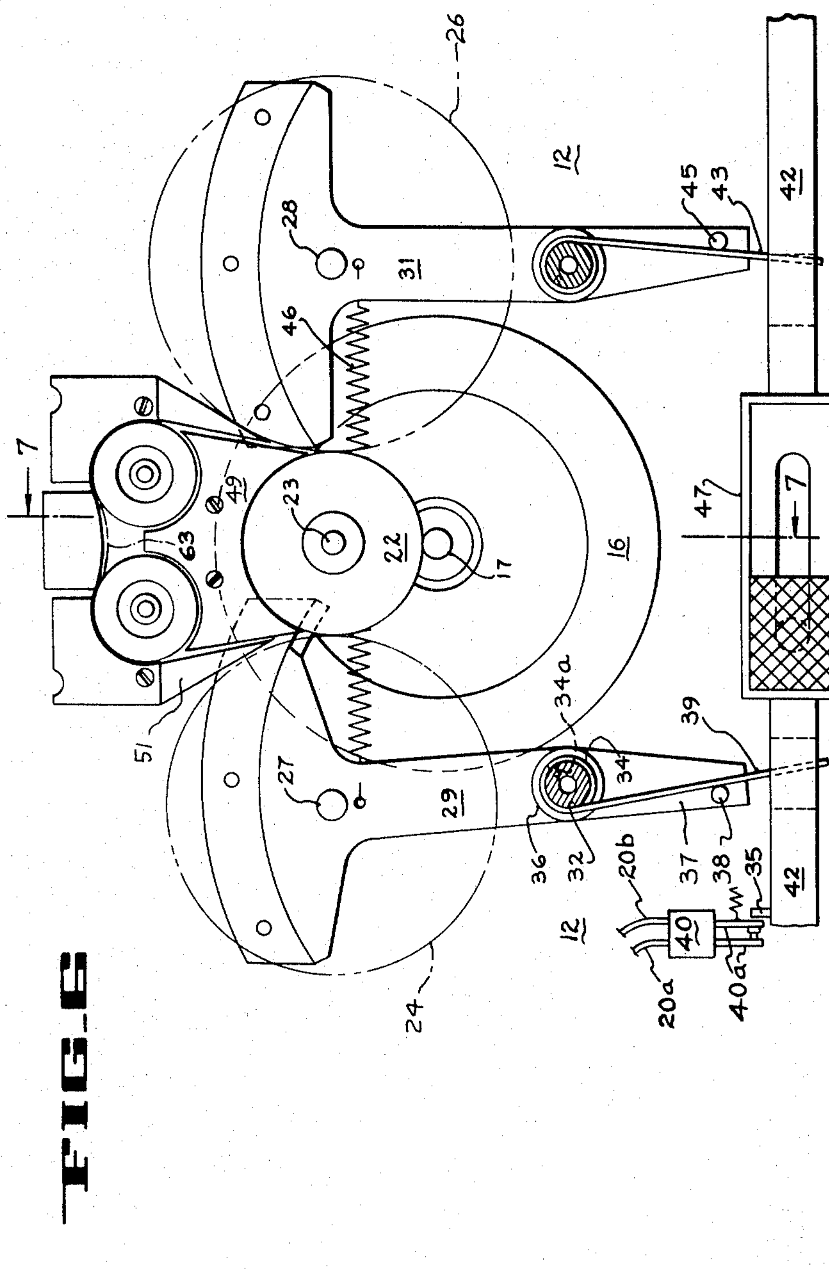
FIG. 6 shows a top plan view of tape transport apparatus according to the invention.
Figure 8:
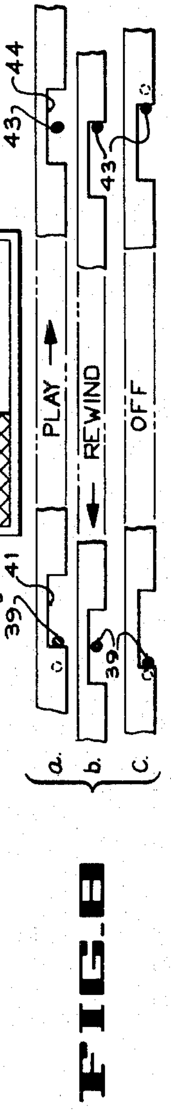
FIG. 8 shows a diagram of the positioning of control bar 42 of FIG. 6 for explanation.

A control slide 47 secured to bar 42 slides back and forth across the face of case 11 to move bar 42 between advanced and retracted positions. As shown best in FIG. 6 assuming that swing arm 29 and its associated support spindle 27 carries the reel of tape 24, and further assuming that it is desired to feed tape from that reel to take-up reel 26 carried on swing arm 31, slide 47 is moved to the right as shown in the drawing.

This action serves to cause the left hand edge of notch 41 to engage tailpiece 39 of coil spring 34 and to move it away from pin 38 so as to relieve spring pressure from lever portion 37 of swing arm 29, i.e., on the "supply" side of transport 10. At the same time, the above noted rightward movement of bar 42 serves to position the ends of notch 44 sufficiently clear of the end of tailpiece 43 so as to permit the spring action thereof to act upon pin 45 in an unfettered manner whereby greater compressive force is applied between take-up reel 26 and body 22 than between supply reel 24 and body 22. Motor 13 is operated by conventional wiring including direction control switch 40 employing reversible contacts 40a.

In feeding tape in a reverse direction, the above conditions are reversed and reel 26 becomes the supply. Thus, bar 42 is simply reversed to rewind the tape from the take-up reel 26 onto the supply reel 24. In this situation, the roles of slots 41 and 44 are simply reversed whereby tailpiece 39 becomes unfettered by its associated slot 41 and tailpiece 43 is prevented from acting upon pin 45 by virtue of engagement with the righthand end wall of slot 44.

Finally, an "off" position has been provided by forming the slots 41, 44 in a manner whereby disposing slide 47 midway between the above two positions serves to move both tailpiece 39 and 43 to positions preventing them from acting against their respective swing arm pins 38, 45 and in this way the compression at the interface between the body 22 and both rolls 24, 26 is reduced to relieve the tire of body 22 from sustained pressure applied at localized locations as can prove harmful in causing "flat spots" on the tire.

Means serving to define a guideway for tape to travel between the supply and take-up reels 24, 26 and for automatically threading the tape from the supply roll to the take-up roll comprises tape channel 48 defined between a stationary guide block 49 secured to deck 12 and a stationary peeler blade element 51 which tapers down to form a relatively sharp blade edge 52. By disposing blade 52 relatively closely to the periphery of tape on reel 24, the widened leader end 53 of a roll of tape will engage blade 52 and enter channel 48.

Means are provided for adhering the outer convolution of tape carried on reel 24 to be retained about the penultimate outer convolution while disposed on reel 24 and also to be retained about the hub portion of take-up reel 26 when pressed thereagainst by means of the rotating body 22.

Accordingly, supply reel 24 includes a pair of resilient flanges 54 secured to a hub portion 56 to be yieldingly wedged apart to a limited degree by the widened leader portion 53 of the length of tape wrapped about hub 56. Similarly, resilient flanges 57 are secured to a take-up hub assembly 58 for winding the tape thereon.

The spacing between the confronting faces of flanges 54, 57 is slightly less than the width of leader 53 whereby as leader 53 is urged against hub assembly 58 by the rotating body 22, the leader will be wedged against and retained by the compressive action of flanges 54, 57. Further, flanges 57 include confronting retainer grooves 59 proximate to hub assembly 58 serving to receive the edges of leader 53 to be held snugly around hub assembly 58.

Means for guiding and supporting a span of tape between the supply and take-up rolls further includes a pair of guide rollers 61 mounted for rotation in positions blanking a magnetic transducer assembly 62 whereby transducer assembly 62 bears against the unsupported span 63 of tape disposed between rollers 61.

Accordingly, operation of the transport assembly to this point proceeds substantially as follows. A reel of magnetic recording tape 24 of a type having a self-threading leader 53 releasably attached at the outer periphery of the roll, as by engagement between the two resilient flanges 54 of reel 24, is disposed upon support spindle 27 carried by swing arm 29. Spindle 27 protrudes via an arcuate slot (not shown) in deck 12 and upwardly into cavity 25 formed within case 11 for receiving supply reel 24.

After supply reel 24 is properly disposed upon spindle 27, swing arm 29 is permitted to be drawn under the urging of bias spring 46 to dispose the periphery of the roll of tape into engagement with tire 21 of body 22.

At that point, slide 47 is moved to the right (as shown) to open the contacts 40a of control switch 40 and to condition the tailpiece 39, 43 as above noted to increase the compressive force between take-up reel 26 and tire 21 as compared to the compressive force between supply reel 24 and tire 21. Power can then be fed to the drive motor 13 for belt-driving, via belt 15, the fly wheel 16, and in this manner rotate drive spindle 17 which engages tire 21 to rotate annular idler body 22 whereby both the supply reel and take-up reel are rotated by direct engagement with tire 21 on idler body 22.

In this mode of operation, reel 24 rotates in the direction of arrow 64 and, as the leading end of leader 53 approaches the peeler blade edge 52, blade edge 52 serves to strip leader 53 from reel 24 and direct it along channel 48. Due to its relative stiffness and length, leader 53 can be pushed through the path defined by guide rollers 61 and ultimately to the interface defined between hub assembly 28 and idler body 22. At that point, the widened leader 53 engages the resilient flanges of reel 26 and urges them apart until the edges of leader 53 are pressed radially inwardly to seat themselves in flange grooves 59 to become tightly wrapped about hub assembly 58.

During this feeding of tape in the foregoing direction as indicated by arrow 64, tension is applied to the tape span defined between the rolls by means of the movement of slide 47 to the right whereby tailpiece 39 of coil spring 34 is drawn out of engagement with pin 38 carried on lever portion 37 of swing arm 29. This tends to reduce the compression applied at the interface between the supply roll and idler body 22 whereas, on the take-up side, there is an increase in compression due to the fact that tailpiece 43 of coil spring 34 on the take-up side remains unfettered by being disposed midway in its notch 44. Under these circumstances, tailpiece 43 acts firmly against pin 45 so as to aid in urging swing arm 31 toward idler body 22.

At such time as it is desired to feed tape from reel 26 back to reel 24, slide 47 is simply moved in the rewind direction (to the left) so as to reverse the switching controlling motor 13 to cause reel 24 to operate in the direction of arrow 66.

Thus, leftward movement of slide 47 serves to move bar 42 to the left whereby a control peg 35 serves to engage the contacts 40a of a direction control switch 40. Switch 40 is, by suitable known means, thereby coupled to reverse the direction of operation of motor 13 from the direction established when the contacts *40a* are open.

From the foregoing, it will be clear that tape can be automatically threaded between supply and take-up reels and attached to the take-up reel under pressure of idler body 22.

Interlock means as now to be described serve to prevent exposure of the tape whenever it is not fully wrapped about supply reel 24.

Thus, means forming a suitable closure for cavity 25 comprises the movable lid 30 supported by hinges 67 disposed to pivot about pins 68 whereby the marginal edge of lid 30 engages a recessed shoulder 69 formed about cavity 25 so that the top surface of lid 30 will be flush with the case 11 when closed. One of hinges 67 includes a detent opening 71 disposed to move in a path and including a detent element 72 movable into and out of opening 71 to lock and unlock the cover or lid 30 when in its advanced position.

Means forming an interlock device serving to maintain lid 30 in its closed (advanced) position until released by rewinding all tape onto supply reel 24 includes the detent opening 71 and detent element 72 whereby a sliding block 73 disposed in the side wall of case 11 carries detent element 72 to move between advanced and retracted positions and normally urges element 72 to its advanced or locking position by means of a spring 74.

Means for retracting the interlock device comprised of detent element 72, the sliding block 73 and spring 74 includes the protruding pin 76 carried by block 73 and an elongate inelastic pliable tendon 77 secured to pin 76 by suitable means.

Means for operating the interlock assembly comprises tendon 77 trained about support guide posts 78, 79 for attachment at its end to a capstan 81 by suitable means. Means for coupling capstan 81 to be driven by rotation of reel 26 and specifically hub assembly 58 whenever tape has been removed from hub assembly 58 includes coupling members 80 disposed to move radially in slots 86 formed in assembly 58. Members 80 are urged radially outwardly of hub assembly 58 by means of a spring wire 83 threaded through the small openings 84 in catch blade portions 82 of each member 80.

Hub assembly 58 is supported upon a first enlarged cylindrical spindle portion 87 of support spindle 28 for rotation relative thereto whereas a second reduced cylindrical spindle portion 88 supports capstan 81 for rotation relative thereto independently of hub assembly 58.

As noted above, each catch blade 82 is a radially inwardly disposed portion of a radially movable coupling member 80 in each of the three instances shown. Thus, the coupling members 80 are carried by hub assembly 58 to move radially thereof between advanced and retracted positions to respectively protrude radially beyond the hub periphery under the urging of spring wire 83 and to be urged to withdraw inwardly thereof upon being wrapped by the length of leader 53 therearound. Thus, catch blade portions 82 are disposed radially inwardly of the hub periphery and move with the coupling members 80 as a portion thereof.

Spindle portion 88 serves to support capstan 81 and a clutch part formed therewith by means of the detent openings 89 disposed in the downwardly depending skirt 91 of capstan 81.

Figure 3:
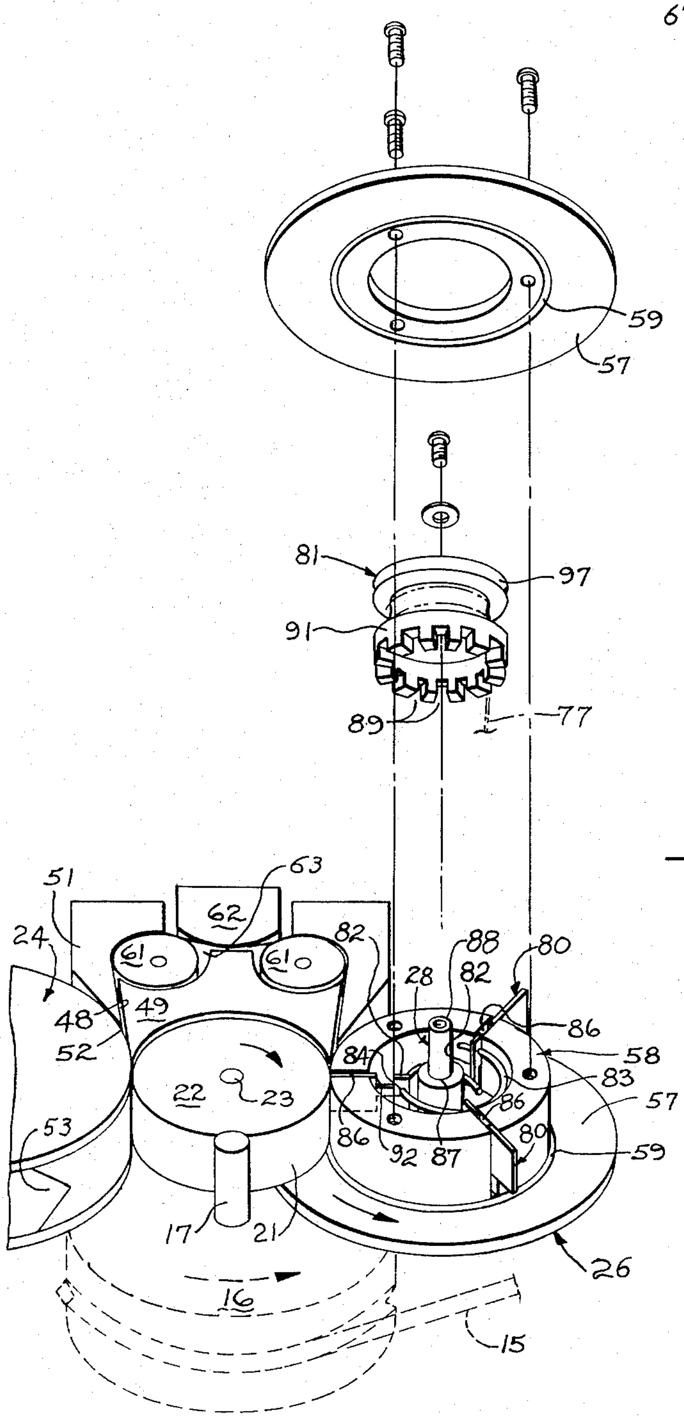
FIG. 3 shows an exploded perspective view of tape transport apparatus according to the invention.
Figure 5:
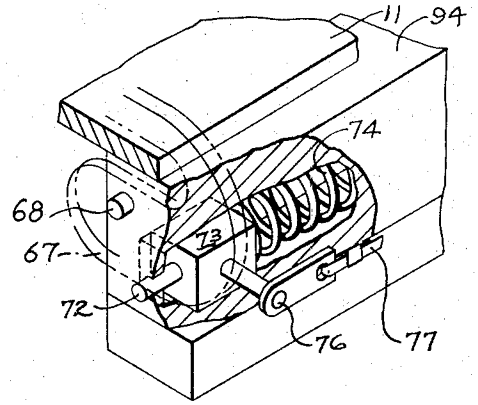
FIGS. 5 and 5A respectively show an enlarged diagrammatic perspective end and elevation views of the detail of the hinge construction.
Figure 5A:
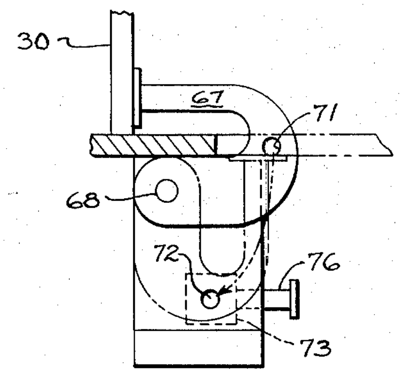
Figure 7:
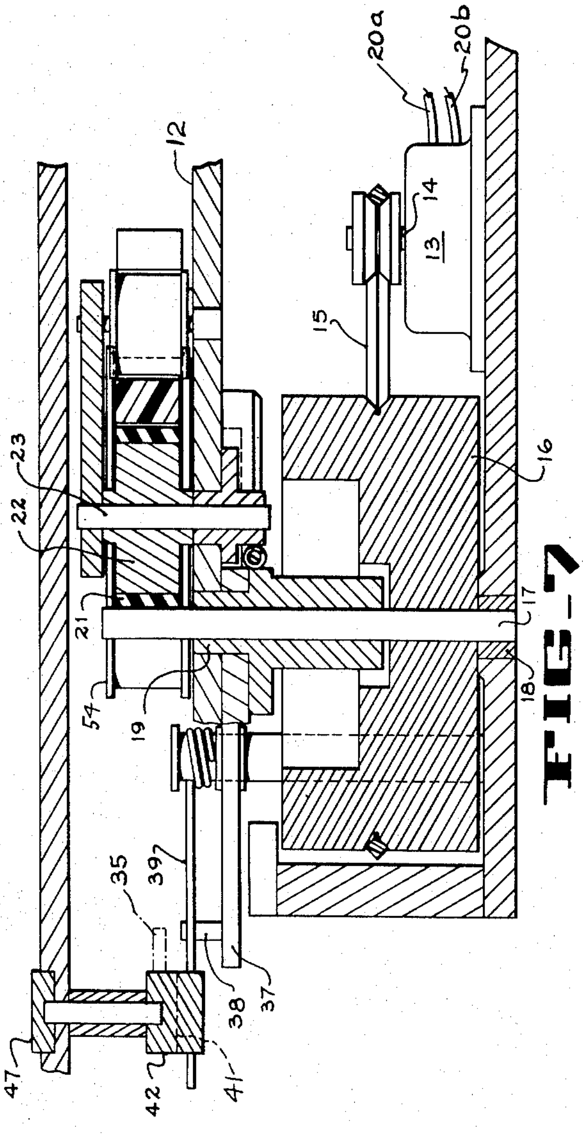
FIG. 7 shows a side elevation section view taken along the line 7—7 of FIG. 6.
Figure 4:
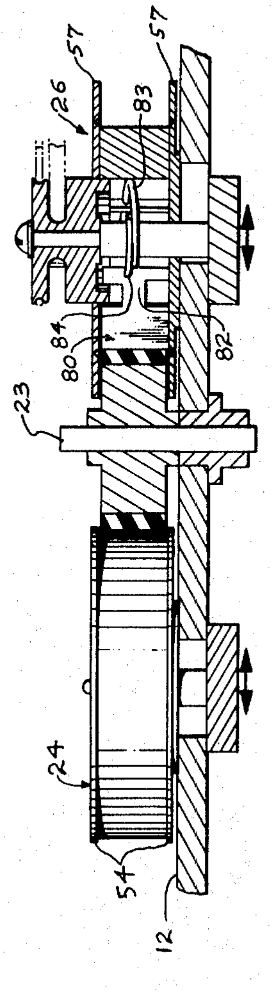
FIG. 4 shows a side elevation section view of a transport apparatus according to the invention.

As shown best in FIG. 3 wherein coupling members 80 are moved to their radially inwardly located positions, skirt 91 travels in the gaps 92 defined between the major portion of coupling members 80 and catch blade portions 82. Whenever any one of the three coupling members 80 is permitted (by removal of leader 53) to be urged radially outwardly, however, the catch blade portion 82 thereof will engage one of the detent openings 89 and form a clutch relationship with the skirt 91 of capstan 81 whereby rotation of hub assembly 58 becomes positively engaged to capstan 81 for rotation consequent to winding up of tendon 77.

This winding of tendon 77 about capstan 81 serves (after removal of slack in tendon 77) to draw movable part 76 in a direction serving to retract detent element 72 to unlock lid 30 from its covered position.

Lid 30 will not be unlocked unless the tape has been fully withdrawn from hub assembly 58 and rewrapped about reel 24 by such reverse rotation. Thus, tendon 77 includes sufficient slack and the ratio of the diameter of capstan 81 is related to the diameter of a full supply reel 24 so that the tape must be entirely rewound on supply reel 24 before the movable part 76 of the interlock device is drawn to its retracted position to change the state or condition of the interlock such as moving detent element 72 to be withdrawn from detent opening 71.

Accordingly, this relationship keeps lid 30 unlocked and serves to prevent exposure of supply reel 24 for withdrawal as long as any portion of the tape is left in the machine (other than on the supply reel).

As soon as detent element 72 has been removed from detent opening 71, lid 30 is sprung slightly upwardly off of shoulder 69 by means of the vertically acting spring-loaded pin 93 located in the back shoulder 94 of cavity 25. Thus, pin 93 slides relatively easily between advanced and retracted positions and, upon closing lid 30, serves to compress a helical spring disposed behind pin 93.

Means for applying a frictional drag resistance to capstan 81 sufficient to overcome any residual driving force applied to the capstan (other than those applied via the clutch means comprised of catch blades 82 and detent openings 89 in skirt 91 of capstan 81) serves to prevent inadvertent winding of capstan 81. Thus, it is evident that capstan 81 is supported independently upon a separate portion of spindle 28 so as not to be drawn along with the rotation of hub assembly 58 unless at least one of the three catch blades 82 is permitted to move radially outwardly as by unwrapping of the tape from hub 58 to relieve the outer end of coupling members 80.

Accordingly, an elongate looped spring wire 96 engages a groove 97 formed in the top flange of capstan 81. Spring wire loop 96 is anchored in a fixed position to guide post 79 in suitable style as, for example, by means of a washer and screw attachment to the top end of guide post 79. Spring wire 96 thereby applies a drag to the rotation of capstan 81 sufficient to overcome all but the clutch originated forces.

From the foregoing, it should be readily evident that there has been provided an improved tape transport apparatus and end of tape sensing interlock control system which serves to operate a suitable interlock for safeguarding the handling of the tape. In the present instance, the interlock prevents the opening of a closure or lid 30 during such times as the tape is not fully wound upon supply reel 24.

It is further evident that other interlock functioning can be achieved by means of operating the movable part 76 of the interlock device whereby, for example, control of the motor 13 can be obtained so as to terminate playing of the tape after it has been played through and wrapped upon the take-up roll. In such circumstances, of course, it might be necessary to provide an additional opening for removing the tape once it has been wrapped upon the take-up roll whereby the next roll of tape could be played by initiating playing from the take-up side of the device.

We claim:

1. In a tape transport apparatus of a type employing a length of tape wrapped to form supply and take-up rolls and a rotating annular resilient body disposed to ride against and drive the take-up roll, an end of tape sensing interlock control system comprising a rotatable take-up hub, a capstan supported adjacent said hub, an interlock device having a control part movable between advanced and retracted positions to operate said interlock device between first and second conditions, an elongate pliable tendon secured at its opposite ends respectively to said capstan and said part, means for guiding said tendon between said capstan and part, and means responsive to the absence of said tape upon said hub and serving to couple said capstan to said hub to cause said capstan to wind up said tendon thereon and move said part to operate said interlock device to one of its said conditions after a predetermined degree of rotation of said capstan, said degree of rotation being sufficient to permit withdrawal of said tape onto the supply roll before operating said interlock device under movement of said control part.

2. In a tape transport apparatus of a type employing a length of tape wrapped to form supply and take-up rolls, an end of tape sensing interlock control system comprising a hub adapted to carry said length of tape wrapped therearound, means supporting said hub for rotation, a capstan, means supporting said capstan for rotation above said hub, an interlock device having a control part movable between advanced and retracted positions to operate said interlock device between first and second conditions, an elongate tendon coupled at its respective ends to said part and said capstan, and clutch means interposed between said capstan and said hub and responsive to the absence of tape upon said hub for coupling said capstan to rotate with said hub to cause said capstan to wind up said tendon and move said part to operate said interlock device to one of its said conditions after a predetermined degree of rotation of said capstan.

3. In a tape transport apparatus according to claim 2 comprising a cover movable between advanced and retracted positions to respectively enclose and expose the supply roll of tape, hinge means supporting said cover for said movement and having a detent opening therein, said interlock device having a detent element movable into and out of said detent opening to lock and unlock said cover when in its advanced position.

4. In a tape transport apparatus according to claim 2 comprising means for applying a frictional drag resistance to the capstan sufficient to overcome any driving forces applied thereto other than those applied via said clutch means in coupling said capstan to said hub.

5. In a tape transport apparatus according to claim 2 wherein said clutch means comprises coupling elements carried by said hub to move radially thereof between advanced and retracted positions to respectively protrude radially beyond the hub periphery and movable to withdraw to the hub periphery, said coupling elements including a catch blade portion disposed radially inwardly of the hub periphery and moving with said elements, detent openings formed to protrude from said capstan and to travel in a path defined between said catch blade portions and the periphery of the hub, and means yieldingly urging said catch blade portions radially outwardly of the hub for engaging one of said detent openings, the urging of the last named means being insufficient to overcome a counterforce applied by wrapping the tape about said hub so as to move said coupling means to a retracted position.

6. In a tape transport apparatus of a type employing a length of tape wrapped to form supply and take-up rolls, a rotating annular resilient body disposed to ride against and drive the supply and take-up rolls, a drive spindle engaging the periphery of said body in driving relation therebetween, a motor for driving said spindle, a rotating hub for forming the take-up roll, means for peeling an end portion of the supply roll free and for guiding same to the interface defined between said take-up roll hub and said body, means for securing said end portion of the tape about said hub, means forming a case containing at least said supply and take-up rolls and said body, a lid attached to said case and movable between advanced and retracted positions to cover and uncover said supply roll, and an interlock device having a control part movable between advanced and retracted positions to operate said interlock device between first and second states respectively locking and unlocking said lid in its covered position, a capstan carried above said hub, an elongate tendon coupled at its respective ends to said part and said capstan, and clutch means responsive to the absence of tape upon said hub for coupling said capstan to said hub to cause said capstan to wind up said tendon and move said part to cause said interlock device to unlock said lid.

* * * * *